United States Patent
Piechocki et al.

(10) Patent No.: US 6,271,287 B1
(45) Date of Patent: Aug. 7, 2001

(54) EPOXY RESINS AND STABLE AQUEOUS DISPERSIONS THEREOF

(75) Inventors: Christian Piechocki, Marienthal (FR); James E. Pate, Sanford, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/390,447

(22) Filed: Sep. 7, 1999

Related U.S. Application Data
(60) Provisional application No. 60/102,943, filed on Oct. 2, 1998.

(51) Int. Cl.$^7$ .............................. C08K 3/20; C08L 63/02
(52) U.S. Cl. ........................................... 523/402; 523/427
(58) Field of Search ..................................... 523/402, 427

(56) References Cited

U.S. PATENT DOCUMENTS

| | | |
|---|---|---|
| 3,360,599 | 12/1967 | Nyberg et al. . |
| 3,503,917 | 3/1970 | Burke, Jr. . |
| 4,018,426 | 4/1977 | Mertz et al. . |
| 4,123,403 | 10/1978 | Warner et al. . |
| 5,037,864 | 8/1991 | Anand et al. . |
| 5,118,729 | 6/1992 | Piechocki . |
| 5,250,576 | 10/1993 | DesMarais et al. . |
| 5,344,856 | 9/1994 | Klein . |
| 5,424,340 | 6/1995 | Pfeil et al. . |
| 5,539,021 | 7/1996 | Pate et al. . |
| 5,602,193 | 2/1997 | Stark . |

FOREIGN PATENT DOCUMENTS 3-157445 * 7/1991 (JP) .

* cited by examiner

*Primary Examiner*—Robert Dawson
*Assistant Examiner*—D. Aylward
(74) *Attorney, Agent, or Firm*—Reid S. Willis

(57) ABSTRACT

An epoxy resin containing a low temperature nonionic surfactant having a molecular weight of less than 7,000 Daltons, a high temperature nonionic surfactant having a molecular weight of greater than 7,000 Daltons, and an anionic surfactant, can be used to prepare an aqueous dispersion of the epoxy resin that has unusually low particle size and unusually long shelf-stability. The dispersion is preferably prepared by way of a high internal phase ratio emulsion.

8 Claims, No Drawings

EPOXY RESINS AND STABLE AQUEOUS DISPERSIONS THEREOF

This application claims the benefit of U. S. Provisional Application No. 60/102,943, filed Oct. 2, 1998.

BACKGROUND OF THE INVENTION

This invention relates to novel epoxy resins and stable aqueous dispersions thereof. Stable aqueous dispersions of epoxy resins are useful in, for example, paper coating and foam backing applications. These dispersions can be used as a crosslinker for other latexes such as S/B latex and carboxylated S/B latex.

Water-borne dispersions of epoxy resins are disclosed, for example, in U.S. Pat. Nos. 5,118,729; 5,344,856; 5,424,340; and 5,602,193, which disclosures are incorporated herein by reference, as well as Japanese Patent Application Kokai: Hei 3-157445.

One of the problems with state-of-the-art water-borne epoxy dispersions is that the shelf-stability of the dispersions is not sufficiently long. It would therefore be an advantage in the art to discover a water-borne epoxy resin with long (greater than 6 months) shelf stability.

SUMMARY OF THE INVENTION

In one aspect, the present invention is a composition comprising a mixture of an epoxy resin and a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and at least one of the following criteria is met:

i) the weight-to-weight ratio of the high temperature nonionic surfactant to the anionic surfactant is greater than 3:1;

ii) the weight-to-weight ratio of the sum of the low temperature nonionic surfactant and the high temperature nonionic surfactant to the anionic surfactant is greater than 4.5:1;

iii) the total surfactant concentration is 5 to 20 weight percent, based on the weight of the total surfactants and the epoxy resin.

In a second aspect, the present invention is a composition comprising a stable aqueous dispersion of an epoxy resin stabilized by a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and at least one of the following criteria is met:

i) the weight-to-weight ratio of the high temperature nonionic surfactant to the anionic surfactant is greater than 3:1;

ii) the weight-to-weight ratio of the sum of the low temperature nonionic surfactant and the high temperature nonionic surfactant to the anionic surfactant is greater than 4.5:1;

iii) the total surfactant concentration is 5 to 20 weight percent, based on the weight of the total surfactants and the epoxy resin.

In a third aspect, the present invention is a stable aqueous dispersion of an epoxy resin prepared by the steps of:

a) continuously merging into a disperser, and in the presence of an emulsifying and stabilizing amount of a surfactant mixture, a flowing stream of water flowing at a rate $r_1$, and a flowing stream containing an epoxy resin flowing at a rate $r_2$;

b) mixing the streams with a sufficient amount of shear to form a high internal phase ratio emulsion; and c) diluting the high internal phase ratio emulsion with water to form the stable aqueous dispersion;

wherein the surfactant mixture includes a low temperature nonionic surfactant and a high temperature nonionic surfactant, wherein the low temperature nonionic surfactant characterized by having a molecular weight of not less than 1,000 and not more than 7,000, the high temperature nonionic surfactant is characterized by having a molecular weight of greater than 7,000 and not more than 20,000; and where $r_2:r_1$ is in such a range that the volume average particle size of the dispersion is not greater than 2 microns.

The present invention addresses a problem in the art by providing a water-borne epoxy resin having a shelf stability of greater than 6 months.

DETAILED DESCRIPTION OF THE INVENTION

The surfactant package is critical to the shelf stability of the epoxy dispersion of the present invention. At least two classes of surfactants are used, the first being a low temperature nonionic surfactant, and the second being a high temperature nonionic surfactant. Preferably, a third class is used as a cosurfactant for the low temperature and high temperature nonionic surfactants.

The low temperature nonionic surfactant is characterized by having a molecular weight of not less than 1,000 and not more than 7,000. Preferred low temperature nonionic surfactants are illustrated:

Formula I

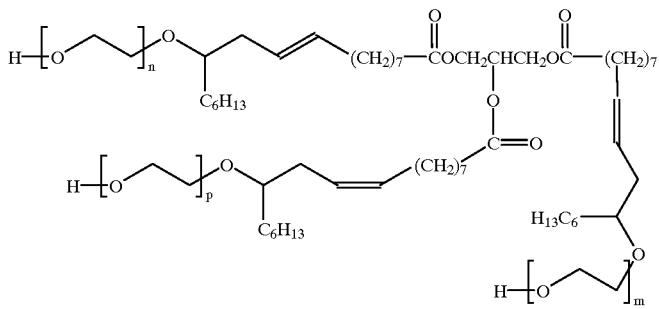

where the sum of n, m, and p in Formula I is such that the molecular weight of Formula I is not less than about 1,000 Daltons, more preferably not less than about 2,000 Daltons, and not more than about 7,000 Daltons, more preferably not more than about 5,000 Daltons. Commercially available Formula I low temperature nonionic surfactants include Hydropalat 3037 nonionic surfactant (available from Henkel, n+m+p=40), Emulgin PRT 100 nonionic surfactant (available from Henkel, n+m+p=100), and Emulpon EL 42 nonionic surfactant (available from Witco, n+m+p=42);

 Formula II where x is from about 10 to 18, and where y is from about 30 to 50, more preferably from about 35 to about 45. A commercially available Formula II low temperature nonionic surfactant is Disponil TA 430 nonionic surfactant (available from Henkel, $x=C_{11}-C_{17}$, y=40);

Formula III

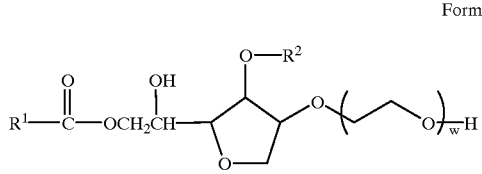

where $R^1$ is oleyl (9-octadecene-yl), and $R^2$ is either

where the sum of w and z is not less than about 10, more preferably not less than about 15, and not greater than about 30, more preferably not greater than about 25. A commercially available Formula III low temperature nonionic surfactant is Sorbanox AO nonionic surfactant (available from Witco), which is a mixture of the Formula III structures.

The high temperature nonionic surfactant is characterized by having a molecular weight of greater than 7,000 and not more than 20,000. Preferably, the high temperature nonionic surfactant has the following structure:

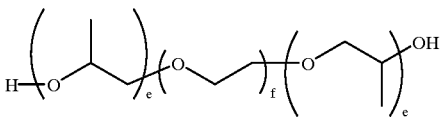

where each e is not less than about 10, preferably not less than about 15, most preferably not less than about 20, and not greater than about 50, more preferably not greater than 40, and most preferably not greater than about 30; and f is not less than about 100, more preferably not less than about 200, and most preferably not less than about 250; and preferably not greater than about 500, more preferably not greater than about 400, and most preferably not greater than about 300. Examples of commercially available high temperature nonionic surfactants include Atsurf 108 surfactant (available from ICI) and Pluronic F108 surfactant (available from BASF Corp.), each with a molecular weight of about 14,000 (e=24; f=255).

Another preferred high temperature nonionic surfactant has the structure of the Formula I nonionic surfactant, wherein the sum of n, m, and p is such that the molecular weight is greater than 7,000 and less than 20,000 Daltons. An example of a commercially available high temperature nonionic surfactant is Emulgin PRT 200 nonionic surfactant (available from Henkel). Other examples of suitable high temperature nonionic surfactants included ethoxylated mono- or dialkyl phenols such as polyethylene glycol nonyl or dinonyl phenyl ethers. An example of a commercially available ethoxylated dialkyl phenyl ether is Igepal DM 970 FLK PEG-i150 dinonyl phenyl ether (available from Rhone-Poulenc).

The weight-to-weight ratio of the low temperature nonionic surfactant to the high temperature nonionic surfactant is preferably not less than about 1:3, more preferably not less than 1:2, and most preferably not less than 1.5:1, and preferably not greater than 3:1, more preferably not greater than about 2:1, and most preferably not greater than about 1.5:1.

Since the quantity of total nonionic surfactant required to prepare epoxy dispersions of satisfactory stability tends to be higher in the absence of a suitable anionic cosurfactant, it is preferred to add a small amount of an anionic cosurfactant to minimize the total surfactant in the dispersion. The anionic surfactant is selected such that the combination of the nonionic surfactants and the anionic surfactant reduce the interfacial tension of the epoxy resin as compared to the interfacial tension of the resin in the absence of the anionic surfactant.

A preferred method of determining the suitability of an anionic surfactant includes the steps of: a) combining the anionic surfactant with a high temperature nonionic surfactant in an epoxy resin at the temperature at which the high temperature nonionic surfactant is effective (usually about 40° C. to about 100° C.), and measuring the interfacial tension of the resin in the presence of the anionic surfactant and the high temperature nonionic surfactant, as compared to the interfacial tension of the resin in the presence of only the high temperature nonionic surfactant; and b) combining the anionic surfactant with a low temperature nonionic surfactant in an epoxy resin at the temperature at which the low temperature nonionic surfactant is effective (usually ambient temperature), and measuring the interfacial tension of the resin in the presence of the anionic surfactant and the low temperature nonionic surfactant resin, as compared to the interfacial tension of the resin in the presence of only the low temperature nonionic surfactant.

A preferred anionic surfactant is one that shows, in combination with either the low or the high temperature nonionic surfactant, a decrease in interfacial tension of the epoxy resin as compared to the interfacial tension of the resin in the absence of the anionic surfactant. More preferably the anionic surfactant is one that shows, in combination with both the low and the high temperature nonionic surfactant, a decrease in interfacial tension of the epoxy resin as compared to the interfacial tension of the resin in the absence of the anionic surfactant. The most preferred anionic surfactant is one that shows a maximal decrease in interfacial tension of the epoxy resin for both the low and the high temperature nonionic surfactants.

For example, when the high temperature surfactant Atsurf 108 nonionic surfactant or a generic equivalent thereof is selected, anionics which have been found to reduce the interfacial tension of an epoxy resin such as D.E.R. 353 resin (available from The Dow Chemical Company) at 80° C. include a long-chain alkyl alkali metal sulfosuccinate such as dioctyl sodium sulfosuccinate (commercially available Aerosol OT 75 anionic surfactant, available from Cyanamid), sodium lauryl sulfate, a sulfosuccinic acid-4-ester with polyethylene glycol dodecylether disodium salt (commercially available as Aerosol A 102 anionic surfactant, available from Cytec), an alkyl disulfonated diphenyloxide disodium salt such as mono- and dialkyl disulfonated diphenyloxide, disodium salt (commercially available as Dowfax 2A1 anionic surfactant, available from The Dow Chemical Company), dihexyl sodium sulfosuccinate (commercially available as Aerosol MA 80 nonionic surfactant, available from Cyanamid), polyoxy-1,2-ethandiyl-α-tridecyl-ω-hydroxyphosphate (commercially available as Rhodafac RS 610 anionic surfactant, available from Rhone-Poulenc), and alkylethersulfate sodium salt (commercially available as Disponil FES 61 or Disponil FES 993 anionic surfactant, available from Henkel). More preferred are those having the surface active agents found in Aerosol OT 75 anionic surfactant, sodium lauryl sulfate, Dowfax 2A1 anionic surfactant, and Rhodofac RS 610 anionic surfactant. Most preferred are anionic surfactants having the surface active agents found in Aerosol OT 75 anionic surfactant, sodium lauryl sulfate, and Dowfax 2A1 anionic surfactant.

When the high temperature nonionic surfactant Emulgin PRT 200 nonionic surfactant or a generic equivalent thereof is selected, anionics which have been found to reduce the interfacial tension of the epoxy resin at 20° C. include those having the surface active agents found in Aerosol OT anionic surfactant, Rhodafac RS 610 anionic surfactant, and Dowfax 2A1 anionic surfactant.

When the low temperature nonionic surfactant Hydropalat 3037 nonionic surfactant or a generic equivalent thereof is selected, preferred anionics include those having the surface active agents found in Aerosol OT 75 anionic surfactant, sodium lauryl sulfate, Aerosol A 102 anionic surfactant, Rhodafac RS 610 anionic surfactant, Dowfax 2A1 anionic surfactant, Aerosol MA 80 anionic surfactant, Disponil FES 993 anionic surfactant, and Disponil FES 61 anionic surfactant, with anionic surfactants having the surface active agents found in Aerosol OT 75 anionic surfactant, sodium lauryl sulfate, Rhodafac RS 610 anionic surfactant, and Dowfax 2A1 anionic surfactant being more preferred.

Thus, the preferred anionic surfactants for the combination of Hydropalat 3037 and Atsurf 108 nonionic surfactants (or the generic equivalents thereof) include those having the surface active agents found in Aerosol OT 75 anionic surfactant, sodium lauryl sulfate, Aerosol A 102 anionic surfactant, Rhodafac RS 610 anionic surfactant, Dowfax 2A1 anionic surfactant, Disponil FES 993 anionic surfactant, and Disponil FES 61 anionic surfactant, with anionic surfactants having the surface active agents found in Aerosol OT 75 anionic surfactant, sodium lauryl sulfate, Rhodafac RS 610 anionic surfactant, and Dowfax 2A1 anionic surfactant being more preferred.

The preferred anionic surfactants for the combination of Hydropalat 3037 and Emulgin PRT 200 nonionic surfactants include Aerosol OT 75 anionic surfactant, Rhodafac RS 610 anionic surfactant, and Dowfax 2A1 anionic surfactant.

When the low temperature nonionic surfactant Emulpon EL 42 nonionic surfactant or a generic equivalent thereof is used, preferred anionics include those having the surface active agents found in Aerosol OT 75 anionic surfactant, sodium lauryl sulfate, Aerosol A 102 anionic surfactant, Rhodafac RS 610 anionic surfactant, Dowfax 2A1 anionic surfactant, Aerosol MA 80 anionic surfactant, with anionic surfactants having the surface active agents found in Aerosol OT 75 anionic surfactant and Dowfax 2A1 anionic surfactant being more preferred.

The preferred anionic surfactants for the combination of Emulpon EL 42 and Atsurf 108 nonionic surfactants (or their generic equivalents) include those having the surface active agents found in Aerosol OT 75 anionic surfactant, sodium lauryl sulfate, Aerosol A 102 anionic surfactant, Rhodafac RS 610 anionic surfactant, Dowfax 2A1 anionic surfactant, with anionic surfactants having the surface active agents found in Aerosol OT 75 anionic surfactant and Dowfax 2A1 anionic surfactant being more preferred.

The preferred anionic surfactants for the combination of Emulpon EL 42 and Emulgin PRT 200 nonionic surfactants (or their generic equivalents) include those having the surface active agents found in Aerosol OT 75 anionic surfactant, Rhodafac RS 610 anionic surfactant, and Dowfax 2A1 anionic surfactant, with anionic surfactants having the surface active agents found in Aerosol OT 75 anionic surfactant and Dowfax 2A1 anionic surfactant being more preferred.

When the low temperature nonionic surfactant Sorbanox AO nonionic surfactant or a generic equivalent thereof is selected, preferred anionics include those having the surface active agents found in Aerosol OT 75 anionic surfactant, sodium lauryl sulfate, Aerosol A 102 anionic surfactant, Rhodafac RS 610 anionic surfactant, Dowfax 2A1 anionic surfactant, Aerosol MA 80 anionic surfactant with anionic surfactants having the surface active agents found in Aerosol A 102 anionic surfactant, sodium lauryl sulfate, Rhodafac RS 610, and Dowfax 2A1 anionic surfactant being more preferred, and anionic surfactants having the surface active agents found in Aerosol A 102 anionic surfactant and Dowfax 2A1 anionic surfactant being most preferred.

For the combination of Sorbanox AO and Atsurf 108 nonionic surfactants, preferred anionics include those having the surface active agents found in Aerosol OT 75 anionic surfactant, sodium lauryl sulfate, Aerosol A 102 anionic surfactant, Dowfax 2A1 anionic surfactant, and Rhodafac RS 610 anionic surfactant, with anionic surfactants having the surface active agents found in Aerosol OT 75 anionic surfactant, sodium lauryl sulfate, Rhodafac RS 610 anionic surfactant, and Dowfax 2A1 anionic surfactant being more preferred.

For the combination of Sorbanox AO and Emulgin PRT 200 nonionic surfactants, preferred anionics include those having the surface active agents found in Aerosol OT 75 anionic surfactant, Rhodafac RS 610 anionic surfactant, and Dowfax 2A1 are preferred.

When the low temperature nonionic surfactant Disponil TA 430 nonionic surfactant or a generic equivalent thereof is selected, preferred anionics include those having the surface active agents found in Aerosol OT 75 anionic surfactant, sodium lauryl sulfate, and Dowfax 2A1 anionic surfactant. For the combination of Disponil TA 430 and Emulgin PRT 200 or Atsurf 108 nonionic surfactants (or equivalents thereof), the preferred anionic surfactants are those having the surface active agents found in Aerosol OT 75 anionic surfactant and Dowfax 2A1 anionic surfactants.

The preferred combinations of low temperature and high temperature nonionic surfactants and anionic surfactants can thus be readily determined.

The preferred ratio of the high temperature nonionic surfactant to the anionic surfactant is greater than 3:2, more preferably greater than about 2:1, and most preferably greater than 3:1, and preferably not more than about 20:1, more preferably not more than about 12:1, and most preferably not more than about 5:1. The preferred ratio of the sum of the low temperature nonionic surfactant and the high temperature nonionic surfactant to the anionic surfactant is greater than 3:1, more preferably greater than 4.5:1, and most preferably greater than 5:1, and preferably less than 100:1, more preferably less than 25:1, and most preferably less than 10:1.

When the anionic surfactant is used, the preferred concentration of surfactant is not less than 5, more preferably not less than 8, and most preferably not less than 9 weight percent, and preferably not greater than 15, more preferably not greater than 12, and most preferably not greater than 11 weight percent, based on the weight of the epoxy resin.

Polyglycidyl ethers of a polyhydroxy hydrocarbon can be prepared by reacting an epihalohydrin with a polyhydroxy hydrocarbon or a halogenated polyhydroxy hydrocarbon. Such preparations are well known in the art. (See for example, U.S. Pat. No. 5,118,729, column 4). A preferred resin is a diglycidyl ether of Bisphenol A.

The stable aqueous dispersion of the epoxy resin can be prepared by any suitable method including those described in U.S. Pat. Nos. 3,360,599; 3,503,917; 4,123,403; 5,037,864; and 5,539,021; the descriptions of which preparations are incorporated herein by reference. Preferably, the stable aqueous dispersion of the epoxy resin is prepared by first preparing a concentrated latex or a high internal phase ratio (HIPR) emulsion, then diluting the concentrated latex or HIPR emulsion with water. Preparing the stable aqueous dispersion from an HIPR emulsion is preferred.

The HIPR emulsion of the epoxy resin may also be prepared by any suitable method, such as those described in U.S. Pat. Nos. 4,018,426; 5,250.576; and 5,539,021; the teachings of which preparations are incorporated herein by reference. Preferably, the HIPR emulsion is prepared by continuously merging into a disperser, a stream of water flowing at a rate $r_1$, and a stream containing the epoxy resin, the low temperature nonionic surfactant, the high temperature nonionic surfactant, and the anionic surfactant, flowing at a rate $r_2$, then mixing the streams with a sufficient amount of shear to form the HIPR emulsion. The ratio of the flow rates $r_2:r_1$ is preferably in such a range that the polydispersity of the HIPR emulsion, defined as the ratio of the volume average particle size to the number average particle size ($D_v/D_n$), is not greater than 2, more preferably not greater than 1.5, and most preferably not greater than 1.3; or the volume average particle size, as measured using a Coulter LS230 particle size analyzer (Coulter Instruments), is not greater than 2 microns, more preferably not greater than 1 micron, and most preferably not greater than 0.5 micron. Preferably, $r_2:r_1$ is not less than about 4:1, more preferably not less than 5:1, and most preferably not less than 9:1, and more preferably not greater than 16:1, more preferably not greater than 14:1, and most preferably not greater than 12:1.

It has surprisingly been discovered that aqueous dispersions of epoxy resins with long shelf stability and an unusually low concentration of surface active agents can be prepared simply with a proper selection of low temperature and high temperature nonionic surfactants and an anionic surfactant. The water-borne epoxy resin can be blended with another latex such as an S/B latex, or used as a crosslinker for a carboxylated S/B latex. Such blends are useful for paper coating or foam backing applications.

The following example is for illustrative purposes only and is not intended to limit the scope of this invention. All tubing measurements refer to the inter-diameter of the tubing.

EXAMPLE

Preparation of a Stable Aqueous Dispersion of an Epoxy Resin Stabilized by Atsurf 108, Disponil TA 430, and Aerosol OT 75

I. Preparation of the Epoxy Resin

Bisphenol A (2075 g) and D.E.R.™ 330 resin (a Trademark of The Dow Chemical Company, 6848 g) were charged into a 10-L stainless steel reactor purged with dry nitrogen. The reagents were stirred mechanically and the reactor temperature was ramped to 130° C. at a rate of 0.8°C./min. After the Bisphenol A dissolved, Al catalyst (500 ppm ethyl triphenyl phosphonium acid acetate based on Bisphenol A and D.E.R. 330 resin, 70 percent active in methanol) was added. The reactor temperature was ramped to 150° C. at a rate of 0.8° C./min to start an exotherm. The reactor was maintained at adiabatic conditions to reach a peak exotherm temperature of 150 to 180° C. for 30 minutes, then cooled to 120° C. When the temperature reached 130° C. the following ingredients were added: p-Toluenesulfonic acid methyl ester (280 ppm, based on Bisphenol A and D.E.R. 330 resin), Atsurf 108 nonionic surfactant (420 g, obtained from Imperial Chemical Company, Ltd.), and Disponil TA 430 nonionic surfactant (510 g, obtained from Henkel). When the temperature reached 120° C., Aerosol OT-75 ionic surfactant (140 g, 75 percent active, obtained from Cyanamid) was added. Stirring was continued at 120° C. for 30 minutes upon which time the epoxy resin became homgeneous.

II. Preparation of the Epoxy Dispersion

The combination of epoxy resin and surfactant described in the preceding part (I) was kept molten in a stainless steel tank at 95° C. This molten disperse phase was pumped continuously through a heated arm (80° C.) of a 0.5-inch (1.2-cm) stainless steel tube fitted to a T, at a continuous rate of 34 g/min. Concurrently, water (the continuous phase) was pumped through an arm of a 0.125-inch (0.3-cm) stainless steel tubing fitted to the T, at a constant rate ranging from 10 g/min to 7.5 g/min. The two streams were merged and mixed together under conditions of shear using a water-jacketed 4-inch (10-cm) centrifugal pump head connected to the T using 0.5-inch (1.2-cm) stainless steel tubing, and operating at 660 rpm. A useful HIPR emulsion was formed in the range where the ratio of the disperse phase to continuous phase was about 6:1 to about 11:1. The HIPR emulsion exiting from the centrifugal pump head subsequently flowed through an arm of another heated (80° C.) 0.5-inch (1.2-cm) stainless steel tube fitted to a T, attached with 0.5-inch (1.2-cm) stainless steel tubing to the inlet of a second water jacketed 4-inch (10-cm) centrifugal pump head. Concurrently, hot dilution water (85° C.) was pumped through an arm of a 0.25-inch (0.6-cm) stainless tubing fitted to the T, at a constant rate sufficient to dilute the solids level of the dispersion to 50 to 60% solids. The volume average particle size and polydispersity were measured using a Coulter LS230 light scattering particle size analyzer. The particle size was measured to be 0.368 micron and the polydispersity ($D_v/D_n$) was measured to be 1.19.

What is claimed is:

1. A composition comprising a mixture of an epoxy resin and a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and each of the following criteria is met:

i) the weight-to-weight ratio of the high temperature nonionic surfactant to the anionic surfactant is greater than 3:1;

ii) the weight-to-weight ratio of the sum of the low temperature nonionic surfactant and the high temperature nonionic surfactant to the anionic surfactant is greater than 4.5:1;

iii) the total surfactant concentration is 5 to 20 weight percent, based on the weight of the total surfactants and the epoxy resin.

2. The composition of claim 1 wherein:

a) the nonionic surfactant characterized by any of the following structures:

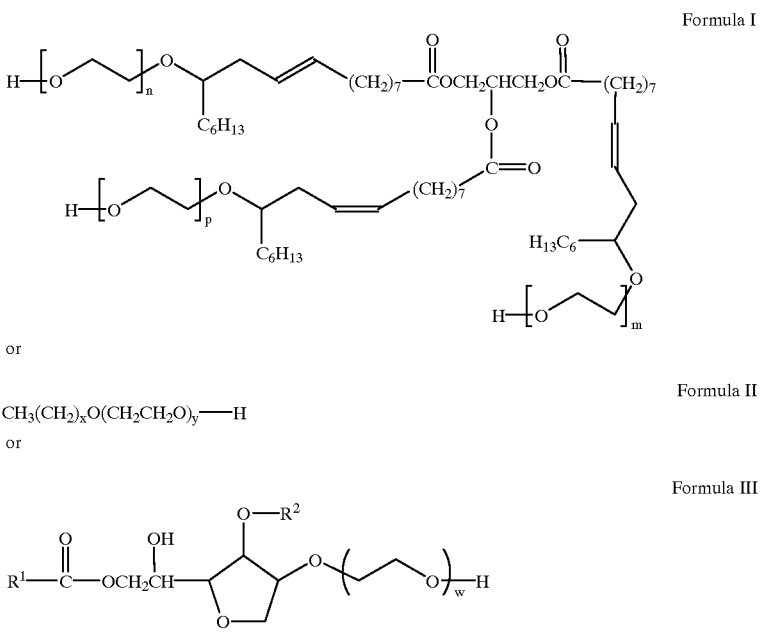

Formula I

Formula II

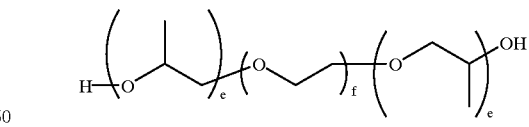

Formula III where the sum of n, m, and p is such that the molecular weight of Formula I is not less than about 1,000 Daltons and not more than 7,000 Daltons; where x is from about 10 to 18, and where y is from about 30 to 50; where $R^1$ is oleyl (9-octadecene-yl), and $R^2$ is either where the sum of w and z is not less than about 10 and not greater than about 30; and b) the high temperature surfactant nonionic surfactant is either an ethoxylated phenol, or is characterized by the structure:

where each e is independently not less than about 10 and not greater than about 50, and f is not less than about 100 and not greater than about 500; or a compound of Formula I where the sum of n, m, and p is such that the molecular weight of I is greater than 7,000 Daltons and less than about 20,000 Daltons.

3. A composition comprising a stable aqueous dispersion of an epoxy resin stabilized by a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and each of the following criteria is met:
  i) the weight-to-weight ratio of the high temperature nonionic surfactant to the anionic surfactant is greater than 3:1;
  ii) the weight-to-weight ratio of the sum of the low temperature nonionic surfactant and the high temperature nonionic surfactant to the anionic surfactant is greater than 4.5:1;
  iii) the total surfactant concentration is 5 to 20 weight percent, based on the weight of the total surfactants and the epoxy resin.

4. The composition of claim 3 wherein the: a) the nonionic surfactant characterized by any of the following structures:

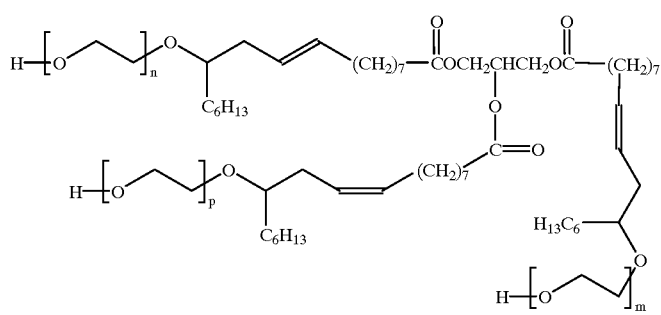

or

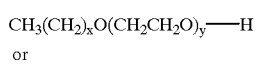

or

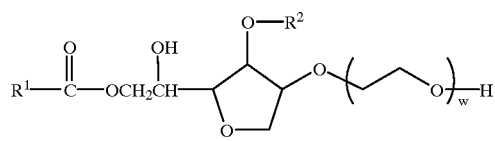

where the sum of n, m, and p is such that the molecular weight of Formula I is not less than about 1,000 Daltons and not more than 7,000 Daltons; where x is from about 10 to 18, and where y is from about 30 to 50; where $R^1$ is oleyl (9-octadecene-yl), and $R^2$ is either

where the sum of w and z is not less than about 10 and not greater than about 30; and b) the high temperature surfactant nonionic surfactant is either an ethoxylated phenol, or is characterized by the structure:

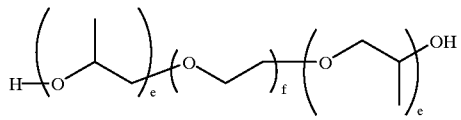

where each e is independently not less than about 10 and not greater than about 50, and f is not less than about 100 and not greater than about 500; or a compound of Formula I where the sum of n, m, and p is such that the molecular weight of I is greater than 7000 Daltons and less than about 20,000 Daltons.

5. A method of preparing a stable aqueous dispersion of an epoxy resin comprising the steps of:
  a) continuously merging into a disperser, and in the presence of an emulsifying and stabilizing amount of a surfactant mixture, a flowing stream of water flowing at a rate $r_1$, and a flowing stream containing an epoxy resin flowing at a rate $r_2$;
  b) mixing the streams with a sufficient amount of shear to form a high internal phase ratio emulsion; and
  c) diluting the high internal phase ratio emulsion with water to form the stable aqueous dispersion;

wherein the surfactant mixture includes a low temperature nonionic surfactant and a high temperature nonionic surfactant, wherein the low temperature nonionic surfactant characterized by having a molecular weight of not less than 1,000 and not more than 7,000, the high temperature nonionic surfactant is characterized by having a molecular weight of greater than 7,000 and not more than 20,000; and where $r_2:r_1$ is in such a range that the volume average particle size of the dispersion is not greater than 2 microns.

6. The method of claim 5 wherein the surfactant mixture further includes an anionic surfactant which, in combination with the low temperature surfactant and the high temperature surfactant, reduces the interfacial tension value of the epoxy resin as compared to the interfacial tension value of the epoxy resin in the absence of the anionic surfactant.

7. The method of claim 6 wherein at least one of the following criteria is met:
   a) the weight-to-weight ratio of the high temperature nonionic surfactant to the anionic surfactant is greater than 3:1;
   b) the weight-to-weight ratio of the sum of the low temperature nonionic surfactant and the high temperature nonionic surfactant to the anionic surfactant is greater than 4.5:1;
   c) the total surfactant concentration is 5 to 20 weight percent, based on the weight of the total surfactants and the epoxy resin.

8. The method of claim 7 wherein $r_2:r_1$ is not less than 4:1 and not greater than 16:1.

* * * * *